(12) United States Patent
Shin et al.

(10) Patent No.: US 8,952,932 B2
(45) Date of Patent: Feb. 10, 2015

(54) METHOD AND APPARATUS FOR SENSING TOUCH INPUT USING ILLUMINATION SENSORS

(75) Inventors: Sung Yong Shin, Daejeon (KR); Hyung Sun Lee, Daejeon (KR); Hee Sook Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 214 days.

(21) Appl. No.: 13/528,255

(22) Filed: Jun. 20, 2012

(65) Prior Publication Data
US 2012/0327038 A1 Dec. 27, 2012

(30) Foreign Application Priority Data

Jun. 22, 2011 (KR) .................. 10-2011-0060621

(51) Int. Cl.
*G06F 3/042* (2006.01)
(52) U.S. Cl.
USPC ........................................ 345/175; 178/18.09
(58) Field of Classification Search
CPC .......... G06F 3/041; G06F 3/045; G06F 3/042
USPC ................... 345/76, 173, 174, 175; 178/18.01–18.06, 18.09, 18.11
See application file for complete search history.

(56) References Cited

U.S. PATENT DOCUMENTS

| | | | |
|---|---|---|---|
| 7,598,949 B2 | 10/2009 | Han | |
| 2008/0198143 A1* | 8/2008 | Kinoshita et al. | 345/175 |
| 2010/0053348 A1* | 3/2010 | Yoshimoto et al. | 348/218.1 |
| 2010/0164883 A1* | 7/2010 | Ahn et al. | 345/173 |
| 2010/0231528 A1 | 9/2010 | Wolfe et al. | |
| 2011/0175853 A1* | 7/2011 | Tateuchi et al. | 345/175 |
| 2011/0186714 A1* | 8/2011 | Hung et al. | 250/214 AL |
| 2011/0187679 A1* | 8/2011 | Ko | 345/175 |

FOREIGN PATENT DOCUMENTS

| | | |
|---|---|---|
| JP | 2010-211324 | 9/2010 |
| KR | 10-2005-0055343 | 6/2005 |
| KR | 10-2010-0022747 | 3/2010 |
| KR | 10-2011-0032874 | 3/2011 |

* cited by examiner

*Primary Examiner* — Pegeman Karimi

(74) *Attorney, Agent, or Firm* — Staas & Halsey LLP

(57) ABSTRACT

Disclosed are a method and an apparatus for sensing touch input using illumination sensors. The apparatus includes: a touch pad on which at least one illumination sensor is arranged; and a controller collecting sensor values of the at least one illumination sensor to perform touch recognition suitable for a present illumination environment.

9 Claims, 6 Drawing Sheets

```
PROCEDURE FIND_ENVIORMENT_VALUE
    FOR windowCount<-0 to windowSize
        FOR columCount<-0 to columSize
            Lux<-Read one Colum of data from sensor
            FOR rowCount<-0 to rowSize
                RowMaxValue<-MAX(Lux(rowCount),Lux(rowCount+1)
                increase rowCount
            END FOR
            ColMaxValue<-MAX(RowMaxValue,ColMaxValue)
            RowMaxValue<-0
            increase columCount
        END FOR
        SumMaxValue<-SumMaxValue+ColMaxValue
        increase windowCount
    END FOR
    EnviormentValue<-SumMaxValue/windowSize
END PROCEDURE
```

FIG. 5

```
PROCEDURE GAIN_CONFIGURE
    IF EnviormentValue<LowEnd
        increase GainLevel
    END IF
    IF EnviromentValue>HighEnd
        decrease GainLevel
    END IF
END PROCEDURE
```

FIG. 6

```
PROCEDURE TOUCH_THRESHOLD
    IF EnviormentValue < GradientZero
        threshold <-FixedThreshold
    ELSE
        threshold<- alpha x EnviormentValue + beta
    END IF
END PROCEDURE
```

FIG. 7

METHOD AND APPARATUS FOR SENSING TOUCH INPUT USING ILLUMINATION SENSORS

CROSS-REFERENCE TO RELATED APPLICATIONS

This application is based on and claims priority from Korean Patent Application No. 10-2011-0060621, filed on Jun. 22, 2011, with the Korean Intellectual Property Office, the present disclosure of which is incorporated herein in its entirety by reference.

TECHNICAL FIELD

The present disclosure relates to a method and an apparatus for sensing touch input, and more particularly, to a method and an apparatus for sensing touch input using illumination sensors.

BACKGROUND

In intelligent devices such as a computer or a mobile terminal, there are many methods for recognizing a user's touch or touch motion in order to control the corresponding device. Currently, the most commonly used methods for recognizing a touch are a pressure-sensitive touch input sensing method and a capacitive touch input sensing method.

The pressure-sensitive touch input sensing method can precisely recognize a contact point, but has disadvantages in that recognition may be achieved only when more than predetermined pressure is applied to the surface of a recognition device, and it is difficult or impossible to apply the method to a flexible material. Korean Patent Application No. 2008-0081417 discloses "Input Detection Method using Piezoresistive Layer", but when the piezoresistive layer is applied to a flexible material such as fabric, not only touch input but crumpling of fabric affects the piezoresistive layer, which makes it impossible to exactly detect input.

The capacitive touch input sensing method provides good touch feeling, but has a complicated circuit configuration and costs a lot of money. In addition, since the method detects a change in capacitance due to a human body touch, it is difficult to use the method in an area adjacent to a human body such as a smart garment and a wearable computer. Therefore, it is difficult to apply the method to simple operation of a small electronic device by remote control and an input device in the wearable computer.

In recent years, a touch input sensing method using light has been actively studied. U.S. Pat. No. 7,598,949 suggested a method for both displaying graphics and sensing touch input using light that is emitted from an LED and reflected by a finger, by using a light-emitting diode (LED) array. However, the method has a disadvantage in that unnecessary power is consumed in a device that does not need an LED output and illumination of the surrounding environment acts as noise to reduce a touch recognition rate. Korean Patent Application No. 2003-0088542 suggested an input apparatus which can substitute for a button by sensing when a user's touch blocks the light quantity input into a sensor using an illumination sensor. When the illumination sensor is used, a service life can be extended compared to an existing button, and an element is small and thus occupies a small space. However, the application did not suggest a solution to the possibility of occurrence of an erroneous operation in the interior having an insufficient light quantity or under sunlight having a very excessive light quantity.

SUMMARY

The present disclosure has been made in an effort to provide a method and an apparatus for sensing touch input using illumination sensors that use low power to be suitable for a mobile environment such as a smart garment, may be implemented at low cost, and are invulnerable to deformation in the surface even though being implemented on the flexible surface.

The present disclosure also has been made in an effort to provide a method and an apparatus for sensing touch input using illumination sensors operating in various illumination environments.

An exemplary of the present disclosure provides a touch input sensing device using illumination sensors, including: a touch pad on which at least one illumination sensor is arranged; and a controller configured to collect sensor values of the at least one illumination sensor to perform touch recognition suitable for a present illumination environment.

Another exemplary of the present disclosure provides a touch input sensing method using illumination sensors, including: sensing an illumination environment using at least one illumination sensor; and collecting sensor values of the at least one illumination sensor to perform touch recognition suitable for a present illumination environment.

According to the exemplary embodiments of the present disclosure, by providing the method and apparatus for sensing touch input using illumination sensors, a driving circuit is simplified, and the illumination sensor has a small volume and thus is suitable to input a touch and a touch gesture on a mobile device, and particularly, is very useful as an input device for a next-generation computer ensuring flexibility such as a wearable computer.

Further, by providing the method and apparatus for sensing touch input using illumination sensors for controlling a gain of a gain amplifier according to a present illumination environment value, unlike a touch recognizing method using an active light source such as a light emitting diode in the related art, low power is consumed by using a natural light source and it is possible to flexibly adapt to a change in illumination, which is a major drawback of an input device using light, thereby achieving touch recognition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 is an algorithm illustrating a process of calculating a present illumination environment value using a maximum value according to an exemplary of the present disclosure.

FIG. 6 is an algorithm illustrating a process of adjusting a gain using a present illumination environment value according to an exemplary of the present disclosure.

FIG. 7 is an algorithm illustrating a process of obtaining a threshold used to perform touch recognition according to an exemplary of the present disclosure.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary of the present disclosure will be described in detail with reference to the accompanying drawings. In describing the present disclosure, well-known constructions or functions will not be described in detail when it is judged that they may unnecessarily obscure the understanding of the present disclosure.

Figure 1:
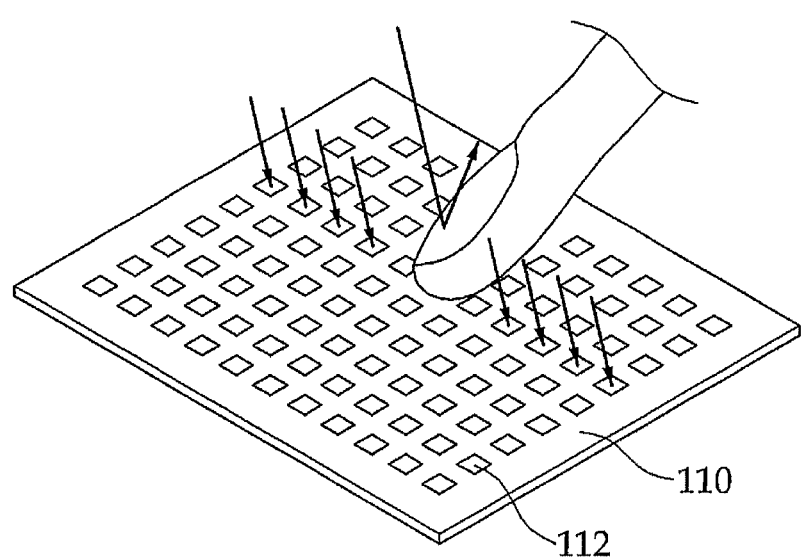
FIG. 1 is a view illustrating a configuration of a touch pad of a touch input sensing device using illumination sensors according to an exemplary of the present disclosure.

FIG. 1 is a view illustrating a configuration of a touch pad of a touch input sensing device using illumination sensors according to an exemplary of the present disclosure.

Referring to FIG. 1, in the touch input sensing device using illumination sensors according to the exemplary of the present disclosure, at least one illumination sensor 112 is arranged two-dimensionally by a method for mounting an electronic element in a touch pad 110 in order to sense touch input. Here, the touch pad 110 may be made of a rigid material such as a printed circuit board (PCB) and plastic, or a flexible material such as fabric.

Therefore, the touch input sensing device may sense a user's touch as light input into the illumination sensor 112 is blocked by the user's touch and determine coordinates where the touch occurs by an arrangement structure of the illumination sensors 112.

Figure 2:
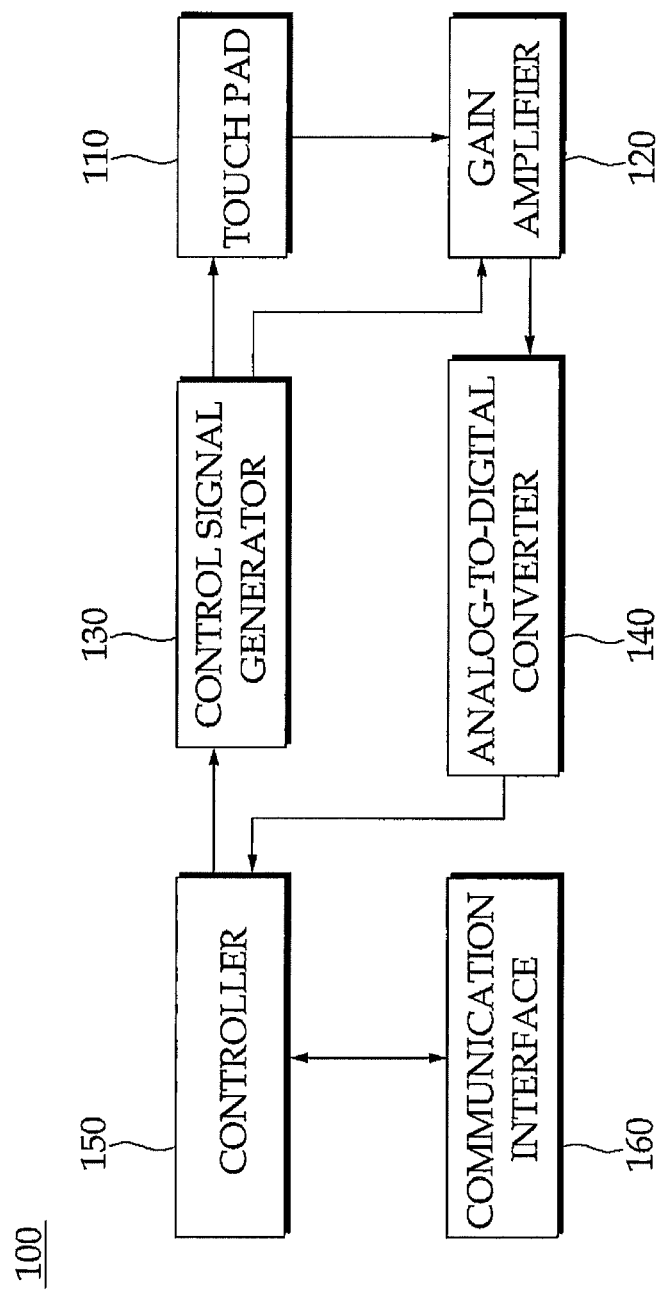
FIG. 2 is a block configuration diagram illustrating a configuration of a touch input sensing device using illumination sensors according to an exemplary of the present disclosure.

FIG. 2 is a block configuration diagram illustrating a configuration of a touch input sensing device using illumination sensors according to an exemplary of the present disclosure.

Referring to FIG. 2, the touch input sensing device 100 according to the exemplary of the present disclosure includes a touch pad 110, a gain amplifier 120, a control signal generator 130, an analog-to-digital converter 140, a controller 150 and a communication interface 160.

In the touch pad 110, at lest one illumination sensor 112 is arranged considering a body part mainly used for touch, for example, a size of a body part such as a finger. Particularly, the at least one illumination sensor 112 is arranged on the touch pad 110 in a matrix of 6×8 and a distance between a row and a column may be maintained at 5 mm so that light of at least one illumination sensor 112 may be blocked when the touch pad 110 is touched, by considering an average width of an adult index finger.

When the at least one illumination sensor 112 is uniformly arranged as described above, it is easy to sense a change in a touch gesture or touch position based on the recognized touch position, but the present disclosure is not limited thereto and at least one illumination sensor 112 may be irregularly arranged depending on the use of touch input.

The at least one illumination sensor 112 is an element that generates current by the incoming light, and may be a small surface mount technology (SMT) element considering that the element is mounted to the flexible surface such as fabric. For example, the at least one illumination sensor 112 may be a photo transistor generating current of about 220 uA per 1000 lx.

The gain amplifier 120 converts the current generated by the at least one illumination sensor 112 into voltage according to a predetermined gain. To this end, the gain amplifier 120 may be constituted by a plurality of amplifiers having different gains. For example, considering that the gain amplifier 120 is constituted by amplifiers having gains of 0.08 V/lx, 0.01 V/lx and 0.0025 V/lx, and a voltage input range of the analog-to-digital converter 140 is 0 to 2.5 V, the maximum illuminations that can be sensed by the at least one illumination sensor 112 are 31 lx, 250 lx and 1000 lx, respectively. In other words, the three gains of the gain amplifier 120 are set in consideration of an indoor environment without lighting and indoor and outdoor environments having lighting.

Therefore, the touch input sensing device 100 according to the exemplary of the present disclosure can recognize a touch in a wide range of illumination environments compared to the case of using a single gain.

Figure 3:
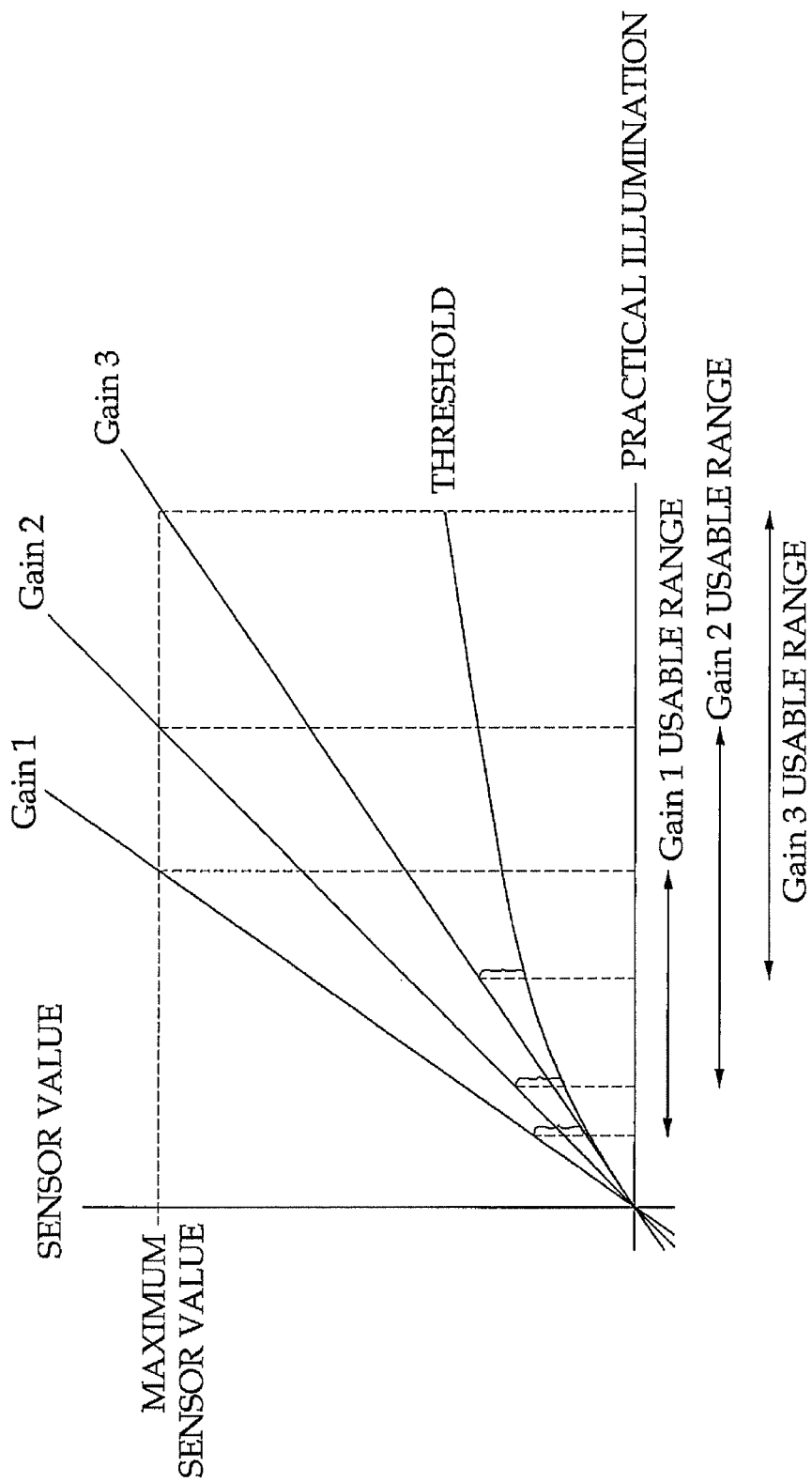
FIG. 3 is a view illustrating that a touch recognition range may be controlled according to illumination environments using three gains.

FIG. 3 is a view illustrating that a touch recognition range may be controlled according to illumination environments using three gains. Here, the maximum sensor value refers to the maximum illumination which the illumination sensor can measure under an arbitrary gain.

Referring to FIG. 3, when the gain of the gain amplifier 120 is set to be small, the sensitivity to the illumination is reduced. As a result, it is possible to measure brighter illumination, but it is difficult to set a threshold in an environment having low illumination. On the other hand, when the gain of the gain amplifier 120 is set to be large, it is possible to recognize a touch in an environment having low illumination, but the output of the illumination sensor 112 is out of the measurement range in a bright illumination environment, which makes it difficult to recognize a touch.

Meanwhile, when the touch input sensing device is implemented using only a small number of illumination sensors depending on the use, hardware may be implemented so as to be capable of simultaneously measuring sensor values of all the illumination sensors. However, in general, when the number of illumination sensors is increased, it is possible to reduce the volume of hardware by dividing groups of illumination sensors based on columns or rows and sequentially reading sensor values of the respective groups.

When the at least one illumination sensor 112 is divided into a plurality of groups based on rows or columns like the latter case, the control signal generator 130 generates a signal that selectively activates respective groups by the control of the controller 150. The control signal generator 130 may also generate a signal that adjusts a gain of the gain amplifier 120 by the control of the controller 150.

The analog-to-digital converter 140 converts a signal amplified by the gain amplifier 120 into a digital signal and transmits the digital signal, that is, the sensor value, to the controller 150.

The controller 150 collects the sensor values of the at least one illumination sensor 112 constituting a top surface of the touch pad 112 to estimate a present illumination environment. Here, there are two methods for collecting the sensor values of the at least one illumination sensor 112 to estimate a present illumination environment by the controller 150.

First, when a sufficiently large number of illumination sensors are arranged on the touch pad 110 and a user provides a touch input using one or two fingers at a time, if an area of a region covered by two fingers does not reach 50% of the area of the touch pad 110, a present luminance environment value $I_{ambient}$ estimated by using a median of the sensor values of all the illumination sensors at an arbitrary moment. Specifically, if at least one illumination sensor 112 is arranged on the touch pad 110 in N columns and M rows, and a sensor value generated by an illumination sensor of an n-th (1≤n≤N) column and an m-th (1≤m≤M) row is $I_{\{n,m\}}$, a set S={$I_{\{n,m\}}$|1≤n≤N, 1≤m≤M} is a set having sensor values of respective illumination sensors as elements. When the elements of the set are arranged in ascending order, the present illumination environment value $I_{ambient}$ is calculated by averaging an N*M/2-th value (rounding up anything below the decimal point to a unit's place) per window size.

Second, if there is no light source capable of concentrating a light quantity on a small area of the touch pad 110 or the light source does not face the touch pad 110, it can be assumed that the maximum value of the light quantity input into the at least one illumination sensor 112 arranged on the touch pad 110 is equal to the illumination of the surrounding environment, and other objects surrounding the touch pad 110 such as a finger have an influence only in the way to reduce the light quantity input into some illumination sensors. Therefore, the present illumination environment value $I_{ambient}$ can be estimated by using the maximum value among the sensor values of all the illumination sensors. Specifically, when elements of a set S={$I_{\{n,m\}}$|1≤n≤N, 1≤m≤M} are arranged in descending order, a present illumination environment value $I_{ambient}$ is calculated by averaging a first element of the set per window size ($I_{ambient}$=max($I_{\{n,m\}}$)).

If the output of the illumination sensor includes much noise and thus a change in the present illumination environment value is very excessive, the noise may be removed from the measured sensor value using a digital filter.

The controller 150 controls the gain of the gain amplifier 120 by using the present illumination environment value in order to sense the user's touch input. This is because when the illumination of the surrounding environment is very low, current that is photoelectrically converted by the illumination sensor is very small, and thus it is difficult to determine whether or not a touch occurs, and when the illumination of the surrounding environment is very high, the output of the illumination sensor may exceed the limit within which the output is converted into a digital value.

For example, when the number of gains of the gain amplifier 120 is K, two thresholds determining whether gain adjustment of an arbitrary gain $g_k$ (1≤k≤K) is needed may be present. If a threshold for determining the case when the present illumination environment value is very small is $I_{\{k,min\}}$, and a threshold for determining the case when the present illumination environment value is very large is $I_{\{k,max\}}$, when the present illumination environment value is smaller than $I_{\{k,min\}}$, the gain of the gain amplifier 120 is increased, and when the present illumination environment value is larger than $I_{\{k,max\}}$, the gain of the gain amplifier 120 is reduced. Therefore, while the smallest gain is used, the gain cannot be reduced any more, and thus $I_{\{1,max\}}$ becomes the maximum value that may be generated by the illumination sensor. While the largest gain is used, the gain cannot be increased any more, and thus $I_{\{K,min\}}$ becomes the minimum value that may be generated by the illumination sensor.

Meanwhile, the gain $g_k$ need not have the same ratio as the gain $g_{(k+1)}$ at all times, but $I_{\{k,min\}}$ and $I_{\{k+1,max\}}$ need to be determined by considering the ratio between the gain $g_k$ and the gain $g_{(k+1)}$ in order to sense the touch input under all illumination environments.

When $I_{\{k,min\}}$ and $I_{\{k+1,max\}}$ are erroneously set, a gain switch between the gain $g_k$ and the gain $g_{(k+1)}$ may occur for every sample. Therefore, in order to prevent this situation, thresholds need to be selected.

The controller 150 sets a threshold $I_{\{k,touch\}}$ for touch determination using the present illumination environment value. It is important to set the threshold to a value that can obviously discriminate the output value of the illumination sensor which is changed before and after a touch occurs. In other words, even though a user's touch occurs, there is a limitation in light quantity blocked by the touch, and thus it is impossible to reduce a photoelectric conversion amount of the illumination sensor to 0. Therefore, the output of the illumination sensor positioned at a touch point is determined by the present illumination environment value and a degree in which a finger by which a touch occurs blocks the light quantity of the illumination sensor.

Thus, the controller 150 calculates a threshold using the following Equation 1. A relationship between the threshold determined by Equation 1 and the present illumination is shown in FIG. 3.

$$I_{\{k,touch\}}=I_{ambient}/(a*\log(I_{ambient}))  \quad \text{[Equation 1]}$$

Here, $I_{\{k,touch\}}$, $I_{ambient}$ and a denote a threshold, a present illumination environment value, and a constant determined by a sensor value measured by an experiment, respectively.

The threshold needs to be implemented by a logarithmic function as in Equation 1, but is not limited thereto, and may use a graph of broken lines having a similar gradient to a logarithmic function for smooth operation in a low performance controller.

As described above, the controller 150 collects the sensor values of the at least one illumination sensor 112 to calculate a present illumination environment value, controls the gain of the gain amplifier 120 according to the present illumination environment value, sets a threshold for touch determination using the present illumination environment value, and then recognizes a touch by coordinates including a sensor value of less than the set threshold.

The communication interface 160 transmits the touch recognition result of the controller 150 to the outside. Here, the communication interface 160 may be a universal asynchronous receiver/transmitter (UART) interface.

Figure 4:
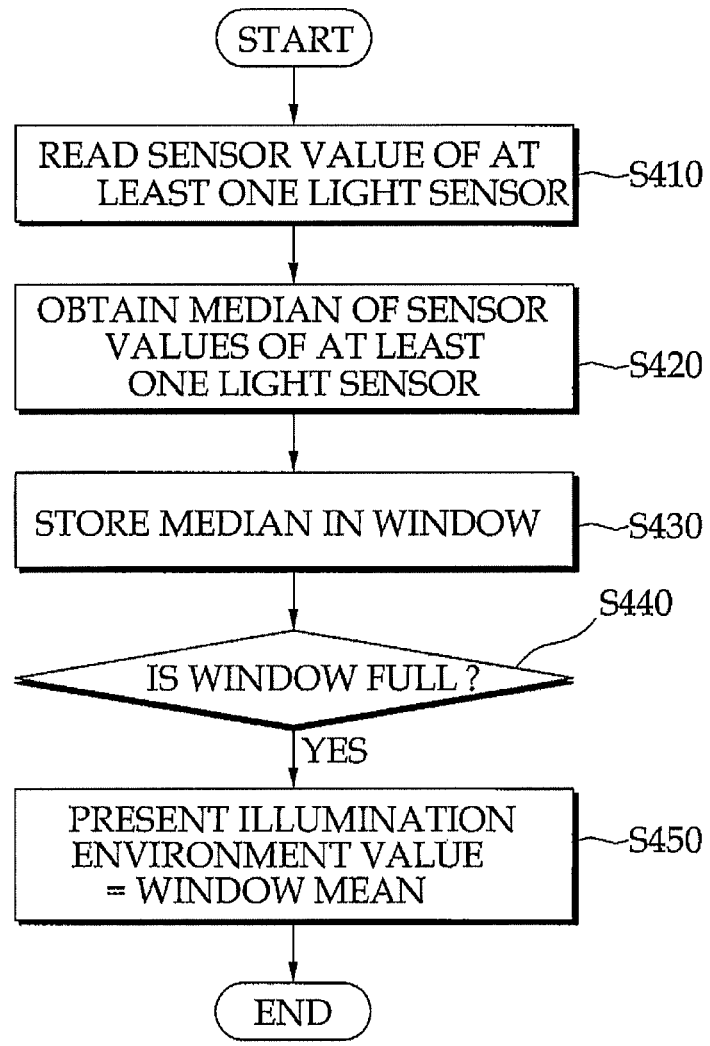
FIG. 4 is a flowchart illustrating a method of calculating a present illumination environment value by collecting sensor values of at least one illumination sensor according to an exemplary of the present disclosure.

FIG. 4 is a flowchart illustrating a method of calculating a present illumination environment value by collecting sensor values of at least one illumination sensor according to an exemplary of the present disclosure.

Referring to FIG. 4, sensor values of at least one illumination sensor 112 are read (S410).

Next, a median of the sensor values of the at least one illumination sensor 112 is obtained (S420). Specifically, if the at least one illumination sensor 112 is arranged on the touch pad 110 in N columns and M rows and a sensor value generated by an illumination sensor of an n-th (1≤n≤N) column and an m-th (1≤m≤M) row is $I_{\{n,m\}}$, a set S={$I_{\{n,m\}}$|1≤n≤N, 1≤m≤M} is a set having sensor values of respective illumination sensors as elements. When the elements of the set are arranged in ascending order, an N*M/2-th value (rounding up anything below the decimal point to a unit's place) becomes a median.

Subsequently, the median is stored in a window (S430).

Thereafter, it is determined whether the window is full (S440) and when the window is full, the medians are divided by a window size to calculate a present illumination environment value $I_{ambient}$ (S450).

In FIG. 4, when the present illumination environment value is calculated using the maximum value instead of the median, at step S420, the elements of a set S={$I_{\{n,m\}}$|1≤n≤N, 1≤m≤M} are arranged in descending order, a first element of the set is set to the maximum value, and then the maximum value is substituted in each step to calculate the present illumination environment value.

FIG. 5 is an algorithm illustrating a process of calculating a present illumination environment value using a maximum value according to an exemplary of the present disclosure.

Referring to FIG. 5, the maximum value max(a, b) is found among values of the illumination sensors entering at one moment and the maximum values are averaged per window size, thus obtaining the present illumination environment value. In this case, the window size, the column size, and the row size are set to 120, 6 and 8, respectively, according to hardware setting.

FIG. 6 is an algorithm illustrating a process of controlling a gain using a present illumination environment value according to an exemplary of the present disclosure.

Referring to FIG. 6, when the present illumination environment value EnvironmentValue is smaller than the minimum threshold LowEnd, the gain GainLevel of the gain amplifier 120 is increased, and when the present illumination environment value EnvironmentValue is larger than the maximum threshold HighEnd, the gain GainLevel of the gain amplifier 120 is reduced. In this case, the minimum threshold LowEnd is set to 200, and the maximum threshold HighEnd is set to 1022.

FIG. 7 is an algorithm illustrating a process of obtaining a threshold used to perform touch recognition according to an exemplary of the present disclosure.

In an exemplary of the present disclosure, the threshold needs to be implemented by the logarithmic function. However, for a smooth operation in a low performance controller, as shown in FIG. 7, a graph of broken lines having a similar gradient to the logarithmic function may be used. In this case, GradientZero, FixedThreshold, alpha and beta are set to 400, 300, 0.5, and 30, respectively.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A touch input sensing device using illumination sensors, comprising:
 a touch pad on which at least one illumination sensor which senses an illumination environment is arranged;
 a controller configured to collect sensor values of the at least one illumination sensor to calculate a present illumination environment value; and
 a gain amplifier configured to convert current generated by the at least one illumination sensor into voltage according to the present illumination environment value;
 wherein the controller set a threshold for touch determination using the present illumination environment value and perform touch recognition based on the set threshold,
 wherein the controller calculates of the present illumination environment value reads sensor values of the at least one illumination sensor,
 wherein the controller obtains a median of the sensor values of the at least one illumination sensor and averages medians per window size to calculate a present illumination environment value, or
 wherein the controller obtains a maximum value of the sensor values of the at least one illumination sensor and averages the maximum values per window size to calculate a present illumination environment value.

2. The touch input sensing device of claim 1, further comprising:
 a gain amplifier configured to convert current generated by the at least one illumination sensor into voltage according to a predetermined gain.

3. The touch input sensing device of claim 2, wherein the controller collects sensor values of the at least one illumination sensor to calculate the present illumination environment value, controls a gain of the gain amplifier according to the present illumination environment value, sets a threshold for touch determination using the present illumination environment value, and then performs touch recognition based on the set threshold.

4. The touch input sensing device of claim 3, wherein the controller reduces the gain of the gain amplifier when the present illumination environment value is larger than a predetermined maximum threshold and increases the gain of the gain amplifier when the present illumination environment value is smaller than a predetermined minimum threshold.

5. The touch input sensing device of claim 3, wherein the controller calculates the threshold using the following Equation 1:

$$I_{\{k,touch\}} = I_{ambient}/(a*\log(I_{ambient}))$$ [Equation 1]

(here, $I_{\{k,touch\}}$, $I_{ambient}$ and a represent a threshold, a present illumination environment value and a constant, respectively).

6. The touch input sensing device of claim 1, wherein the at least one illumination sensor is divided into a plurality of groups based on rows or columns,
 further comprising:
 a control signal generator generating a signal selectively activating the respective groups.

7. A touch input sensing method using illumination sensors, comprising:
 sensing an illumination environment using at least one illumination sensor;
 collecting sensor values of the at least one illumination sensor to calculate a present illumination environment value;
 controlling a gain converting current generated by the at least one illumination sensor into voltage according to the present illumination environment value;
 setting a threshold for touch determination using the present illumination environment value; and
 performing touch recognition based on the set threshold,
 wherein the calculating of the present illumination environment value reads sensor values of the at least one illumination sensor, obtains a median of sensor values of the at least one illumination sensor, stores the median in a window, averages the medians stored in the window per window size to calculate the present illumination environment value, or
 wherein the calculating of the present illumination environment value reads sensor values of the at least one illumination sensor, obtains the maximum value among sensor values of the at least one illumination sensor, stores the maximum value in a window and averages the maximum values stored in the window per window size to calculate the present illumination environment value.

8. The touch input sensing method of claim 7, wherein in the controlling of the gain, when the present illumination environment value is larger than a predetermined maximum threshold, the gain is reduced, and when the present illumination environment value is smaller than a predetermined minimum threshold, the gain is increased.

9. The touch input sensing method of claim 7, wherein in the setting of the threshold, the threshold is calculated using the following Equation 2:

$$I_{\{k,touch\}} = I_{ambient}/(a*\log(I_{ambient})) \qquad \text{[Equation 2]}$$

(here, $I_{\{k,touch\}}$, $I_{ambient}$ and a represent a threshold, a present illumination environment value, and a constant, respectively).

\* \* \* \* \*